US005605377A

United States Patent [19]

Tame

[11] Patent Number: 5,605,377
[45] Date of Patent: Feb. 25, 1997

[54] VEHICLE SEAT WITH FULL MEMORY EASY ENTRY

[75] Inventor: Omar D. Tame, W. Bloomfield, Mich.

[73] Assignee: Atoma International Inc., Markham, Canada

[21] Appl. No.: 534,990

[22] Filed: Sep. 27, 1995

[51] Int. Cl.$^6$ .................................................. B60N 2/08
[52] U.S. Cl. ........................................ 297/341; 248/430
[58] Field of Search ............................ 297/341; 248/429, 248/430

[56] References Cited

U.S. PATENT DOCUMENTS

| | | | |
|---|---|---|---|
| 4,508,385 | 4/1985 | Bowman | 248/429 X |
| 4,621,867 | 11/1986 | Perring et al. | 248/429 X |
| 5,407,165 | 4/1995 | Balocke | 248/429 |

FOREIGN PATENT DOCUMENTS

| | | | |
|---|---|---|---|
| 2430330 | 3/1980 | France | 248/429 |

*Primary Examiner*—Peter M. Cuomo
*Assistant Examiner*—David E. Allred
*Attorney, Agent, or Firm*—Cushman Darby & Cushman Intellectual Property Group of Pillsbury Madison & Sutro LLP

[57] ABSTRACT

A vehicle seat comprising a memory carriage assembly having a connector mechanism mounted thereon for movement between first and second positions, and an actuator mechanism mounted thereon for movement between first and second positions. The memory carriage assembly is arranged with respect to the releasable locking assembly and both the manual and seat back actuated releasing mechanisms of the seat so that (1) when the releasable locking assembly is in the locked position thereof the actuator mechanism is in the first position thereof and the connector mechanism is in the first position thereof, (2) when the releasable locking assembly is released by the seat back actuated releasing mechanism, the actuator mechanism is moved from the first position thereof into the second position thereof to enable the connector mechanism to retain the memory carriage assembly in a stationary position while the seat is moved forwardly and returned with the return causing the actuator mechanism to enable the releasable locking assembly to return to its locking position which, in turn, moves the actuator mechanism from the second position thereof into the first position thereof, and (3) when the releasable locking assembly is released by the manually actuated releasing mechanism, the actuator mechanism will be retained in the first position thereof to enable the memory carriage assembly to be moved by the connector mechanism with the seat.

10 Claims, 6 Drawing Sheets

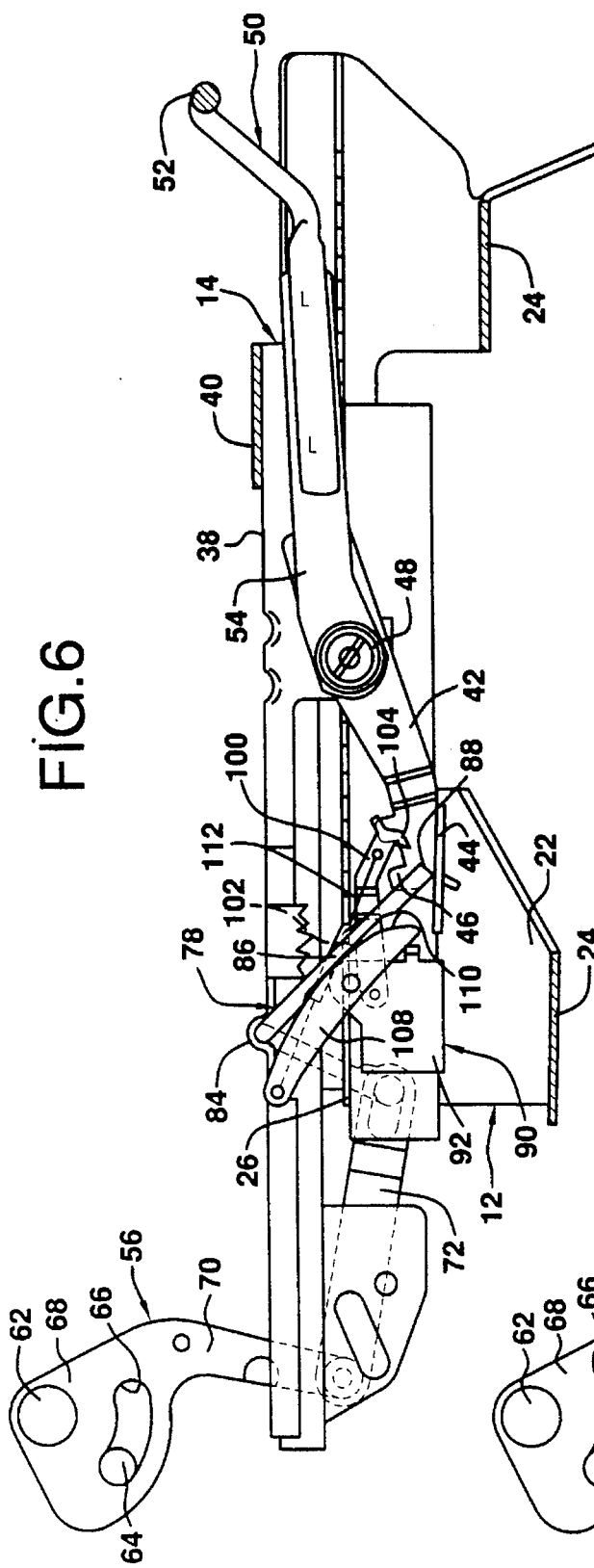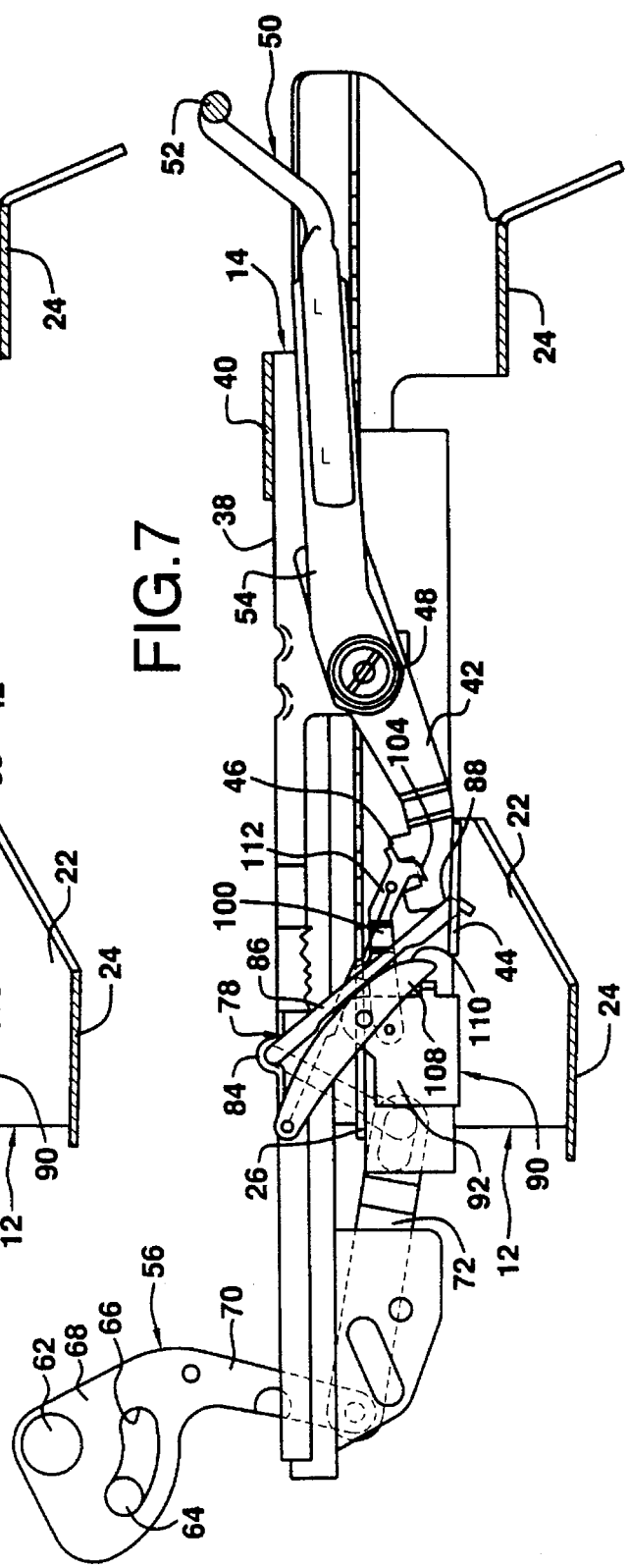

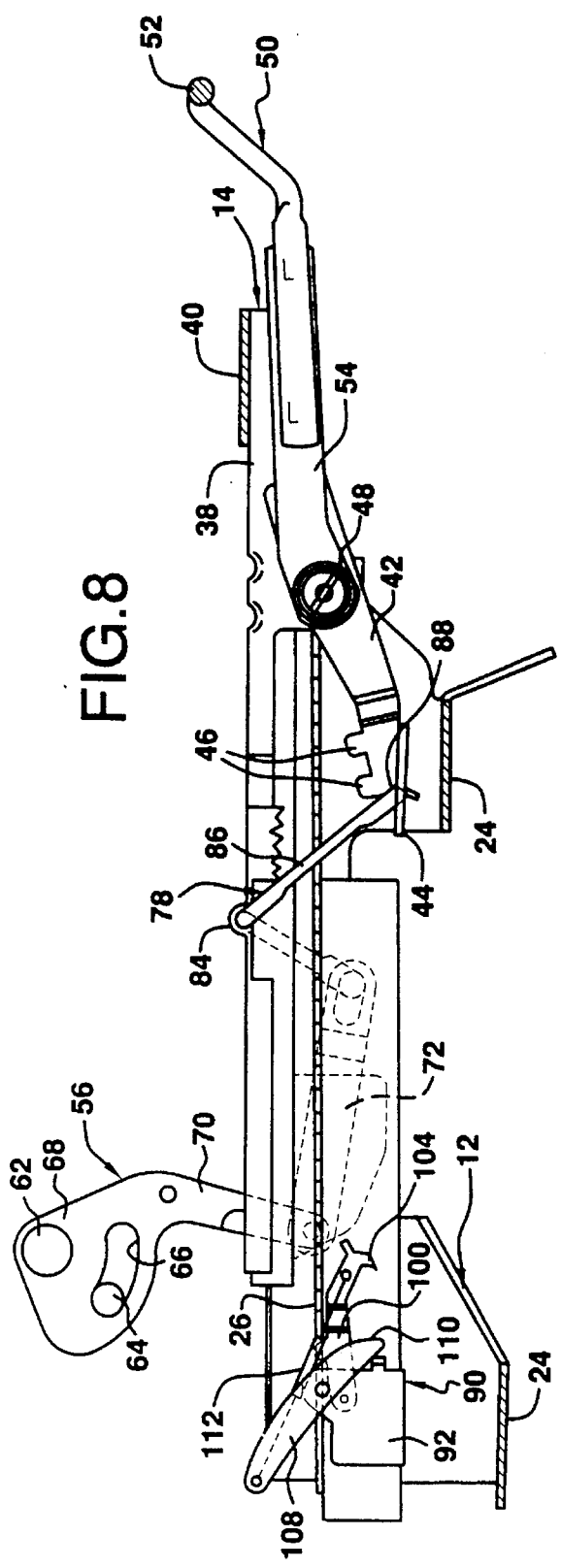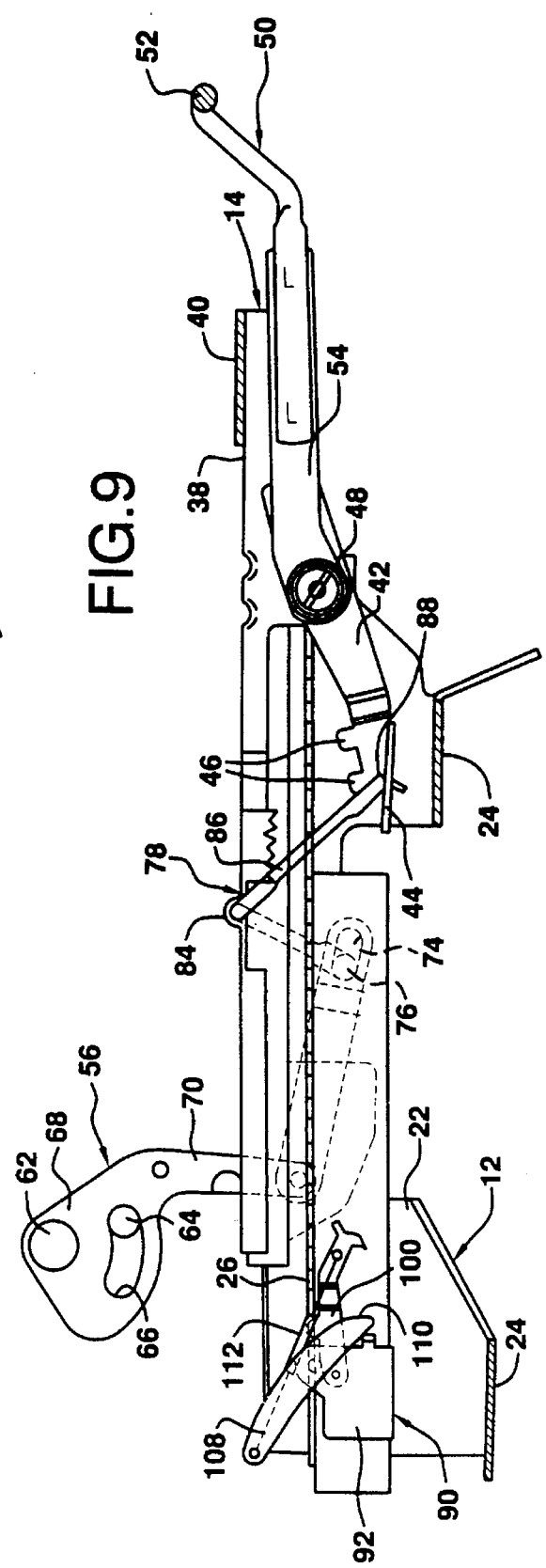

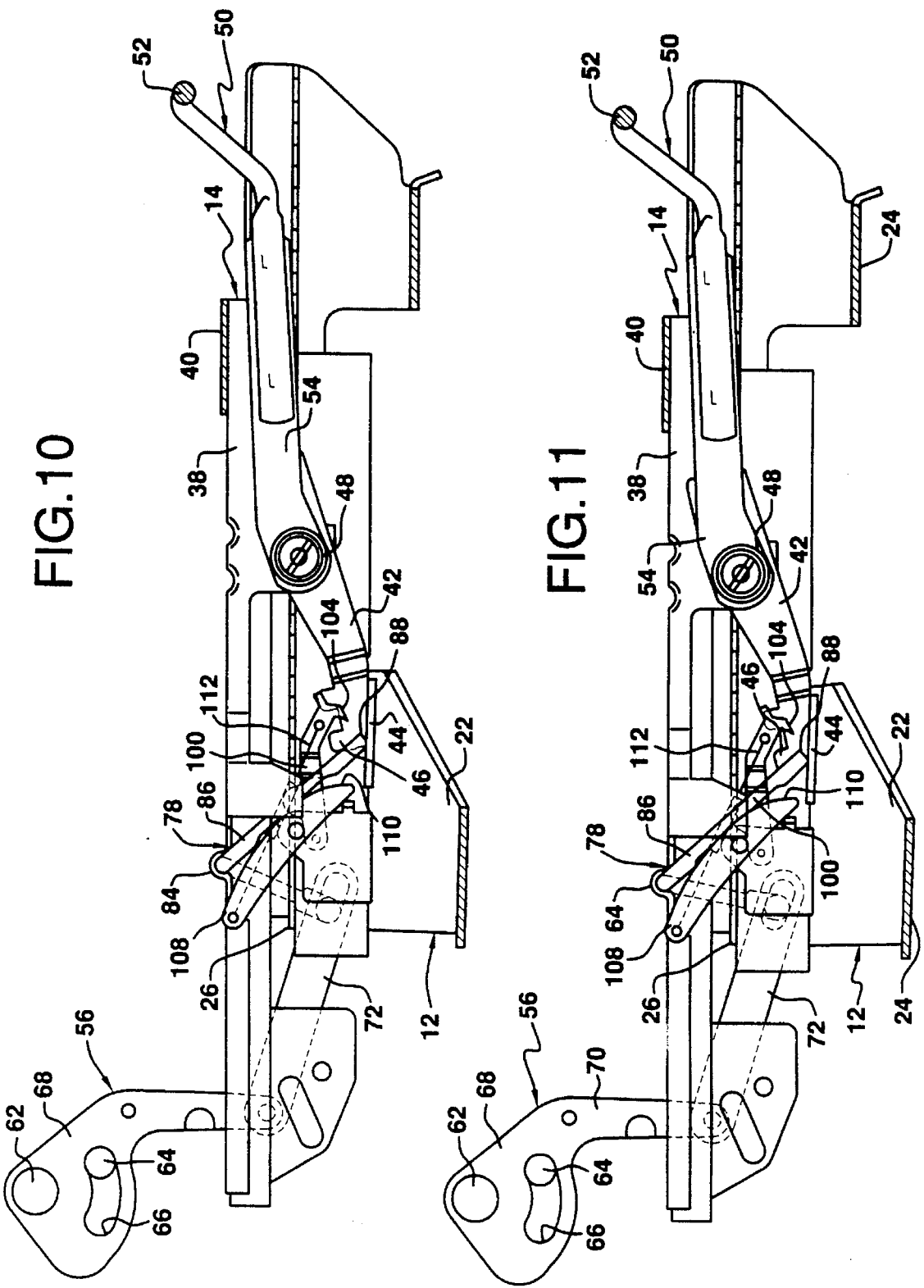

VEHICLE SEAT WITH FULL MEMORY EASY ENTRY

This invention relates to vehicle seats and more particularly to vehicle seats of the type adapted to be utilized as front seats in a two-door vehicle having the capability of being moved into a rear access position enabling a rider to more readily enter and exit into and out of the back seat.

Vehicle seats of the type herein contemplated are well known. Such seats are constructed so that the seat back cushion assembly can be pivoted from an operative position into a rear accessing position disposed forwardly in overlying relation to the seat cushion assembly. In addition, the entire seat including both the seat cushion assembly and the seat back cushion assembly are mounted on a track assembly enabling the seat to be selectively moved in a fore and aft direction. The track assembly typically includes a pair of fixed track assemblies and a pair of movable track assemblies mounted on the fixed track assemblies for fore and aft movement and carrying the seat thereon. Typically, a releasable locking assembly is provided for selectively locking the seat in any fore and aft position of adjustment. In addition, a manually actuated releasing mechanism and a seat back actuated releasing mechanism are provided so as to enable the seat to be (1) moved fore and aft into a selected position of adjustment or (2) moved fore and aft in conjunction with the movement of the seat back cushion assembly into its rear accessing position so as to provide even more space to accommodate the ingress or egress of a back seat rider.

Some rear access providing seats have a memory system which enables the user during a rear access movement of the seat to return it to the same position of adjustment it was in before the rear access movement was undertaken. A problem encountered in seats having this memory capability occurs when the seat back assembly is returned from the rear accessing position thereof into the operative position thereof before the rear accessing fore and aft movement has been completed rather than after such movement. When the seat back cushion assembly is prematurely returned, the locking mechanism is spring biased to return into its locked position. While it will not be allowed to so return until the seat is returned into its starting position, such movement is undertaken with the locking mechanism moving along a fixed surface in engagement therewith under a spring bias. This scraping action is undesirable.

An object of the present invention is to provide a vehicle seat of the type described which obviates the problem noted above. In accordance with the principles of the present invention, this objective is achieved by providing a track assembly including a fixed track assembly constructed and arranged to be disposed in fixed relation in a vehicle and a movable track assembly mounted on the fixed track assembly for fore and aft movement with respect thereto. A seat cushion assembly is carried by the movable track assembly for movement therewith. The seat back cushion assembly is mounted for movement with the movable track assembly in operative relation with the seat cushion assembly, the seat back cushion being constructed and arranged to be pivotally moved with respect to the seat cushion assembly between (1) an operative position disposed to support the back of an occupant in operative seated relation on the seat cushion assembly and (2) a rear accessing position disposed forwardly in overlying relation to the seat cushion assembly. A releasable locking assembly is carried by the movable track assembly for movement between locking and releasing positions, the releasable locking assembly being constructed and arranged (1) when in the locking position to lock the fixed and movable track assemblies together with the cushion assemblies in any one of a multiplicity of different fore and aft positions and (2) when in the releasing position to permit relative movement between the fixed and movable track assemblies to enable the cushion assemblies to be moved into any one of a multiplicity of positions. A manually actuated releasing mechanism is carried by the movable track assembly for movement between an inoperative position and an operative position, the manually actuated releasing mechanism being constructed and arranged with respect to the releasable locking mechanism (1) to control the movement of the releasable locking assembly from the locking position thereof into the releasing position thereof when the manually actuated releasing mechanism is moved from the inoperative position thereof into the operative position thereof and (2) to control the movement of the releasable locking assembly from the releasing position thereof into the locking position thereof when the manually actuated releasing mechanism is moved from the operative position thereof into the inoperative position thereof. A seat back actuated releasing mechanism is carried by the movable track assembly for movement between inoperative and operative positions, the seat back actuated releasing mechanism being constructed and arranged with respect to the seat back cushion assembly and the releasable locking mechanism to be moved (1) from the inoperative position thereof into the operative position thereof in response to the movement of the seat back cushion assembly from the operative position thereof into the rear accessing position thereof during which the releasable locking assembly is moved from the locking position thereof into the releasing position thereof and (2) from the operative position thereof into the inoperative position thereof. A memory carriage assembly is provided which is constructed and arranged to be moved independently in a fore and aft direction with respect to the track assembly. The memory carriage assembly has a connector mechanism mounted thereon for movement between first and second positions, the connector mechanism being constructed and arranged to connect the memory carriage assembly for movement with the movable track assembly relative to the fixed track assembly when the connector mechanism is in the first position thereof and (2) to connect the memory carriage assembly in fixed relation with the fixed track assembly at a position corresponding to the desired position of the cushion assemblies with respect to the fixed track assembly when the connector mechanism is moved from the first position thereof into the second position thereof. The memory carriage assembly also has an actuator mechanism mounted thereon for movement between first and second positions, the actuator mechanism being constructed and arranged (1) to move the connector mechanism from the first position thereof into the second position thereof when the actuator mechanism is moved from the first position thereof into the second position thereof and (2) to move the connector mechanism from the second position thereof into the first position thereof when the actuator mechanism is moved from the second position thereof into the first position thereof. The arrangement of the releasable locking assembly, releasing mechanisms and actuator mechanism are such that (1) when the releasable locking assembly is in the locking position thereof the actuator mechanism is in the first position thereof and the connector mechanism is in the first position thereof, (2) when the releasable locking assembly is moved from the locking position thereof into the releasing position thereof by the movement of the seat back actuated releasing mechanism from the inoperative position into the operative position thereof in response to the movement of the seat back cushion assembly from the operative position thereof into the rear access position thereof the actuator mechanism is moved from the first position thereof into the second position thereof to enable the connector mechanism to retain the memory carriage assembly in fixed relation to the fixed track assembly at a position corresponding to the position of the cushion assemblies therewith, thereby enabling the cushion assemblies to be moved (A) forwardly from the corresponding position with the seat back releasing mechanism and the releasable locking assembly is disposed in a cooperative relationship wherein the releasable locking assembly is retained in its releasing position and (B) returned rearwardly into the corresponding position wherein the actuator mechanism disrupts the cooperating relationship between the releasable locking assembly and the seat back releasing mechanism enabling the releasable locking assembly to return to its locking position and the actuator mechanism to be moved from the second position thereof into the first position thereof, and (3) when the releasable locking assembly is moved from the locking position thereof into the releasing position thereof by the movement of the manually actuated releasing mechanism from the normally biased inoperative position thereof into the operative position thereof the actuator mechanism will be retained in the first position thereof to enable the memory carriage assembly to be moved by the connector mechanism with the cushion assemblies.

Another object of the present invention is the provision of a vehicle seat of the type described which is simple in construction, effective in operation and economical to manufacture and maintain.

These and other objects of the present invention will become more apparent during the course of the following detailed description and appended claims.

The invention may best be understood with reference to the accompanying drawings wherein an illustrative embodiment is shown.

IN THE DRAWINGS

FIG. 6 is a view similar to FIG. 5 showing the position of the seat components after the seat back actuated releasing mechanism has been moved into the operative position thereof;

FIG. 7 is a view similar to FIG. 6 showing the position of the seat components after a short forward movement of the seat beyond the position shown in FIG. 6; FIG. 7 also shows the position of the parts after the seat has been moved into its forwardmost position and returned to a position just short of the original position thereof, with the seat back cushion assembly retained in its rear accessing position;

FIG. 8 is a view similar to FIG. 7 showing the position of the seat components after the seat has been moved into its forwardmost position;

FIG. 9 is a view similar to FIG. 8 showing the position of the seat components with the seat in its forwardmost position and the seat back cushion assembly moved into its operative position;

FIG. 10 is a view similar to FIG. 9 showing the position of the seat components when the seat has been returned to a position just short of the original position thereof and the seat back cushion assembly has been returned to the operative position thereof; and FIG. 11 is a view similar to FIG. 10 showing the position:Of the seat components just after the seat has reached the original position thereof and the seat back cushion assembly has been returned to the operative position thereof.

Figure 1:
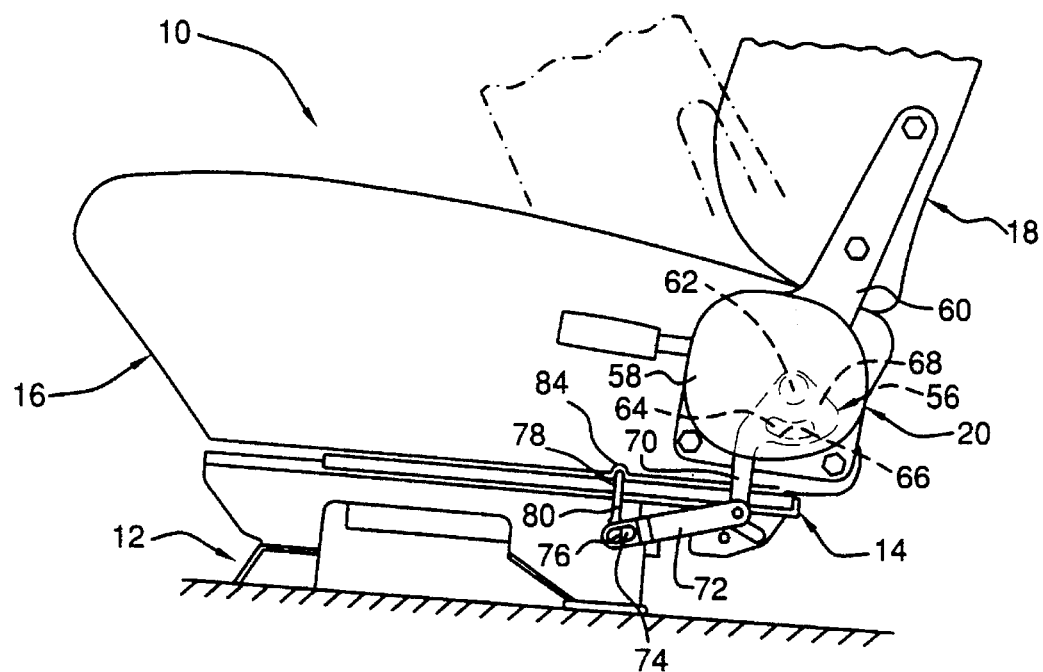
FIG. 1 is a fragmentary lefthand side elevational view of a vehicle seat embodying the principles of the present invention.

Referring now more particularly to FIG. 1 of the drawings, there is shown therein a vehicle seat, generally indicated at 10, which embodies the principles of the present invention. The seat assembly 10 includes in general a track assembly including a fixed track assembly, generally indicated at 12, and a movable track assembly, generally indicated at 14, a seat cushion assembly, generally indicated at 16, mounted on the movable track assembly 12, and a seat back cushion assembly, generally indicated at 18, mounted on the seat cushion assembly 16.

It will be understood that the seat cushion assembly 16 and the seat back cushion assembly 18 are each constructed in accordance with conventional practice. Such practice may involve the provision of a skeletonized frame of some sort having suitably covered cushioning material suitably mounted thereon. In the embodiment shown, the frame of the seat back cushion assembly 18 is mounted on the frame of the seat cushion assembly 16 for selective pivotal movement between (1) a normal operative position extending upwardly and rearwardly from the rear portion of the seat cushion assembly 16 so as to provide back support for a seat occupant sitting on the seat cushion assembly 16 and (2) a rear accessing position wherein the seat back cushion assembly 18 extends forwardly in overlying relation to the seat cushion assembly 16. Any conventionally constructed hardware may be utilized to provide this mode of operation, such as the manually lockable and releasable mounting assembly shown in FIG. 1 and designated generally by the reference numeral 20.

Figure 2:
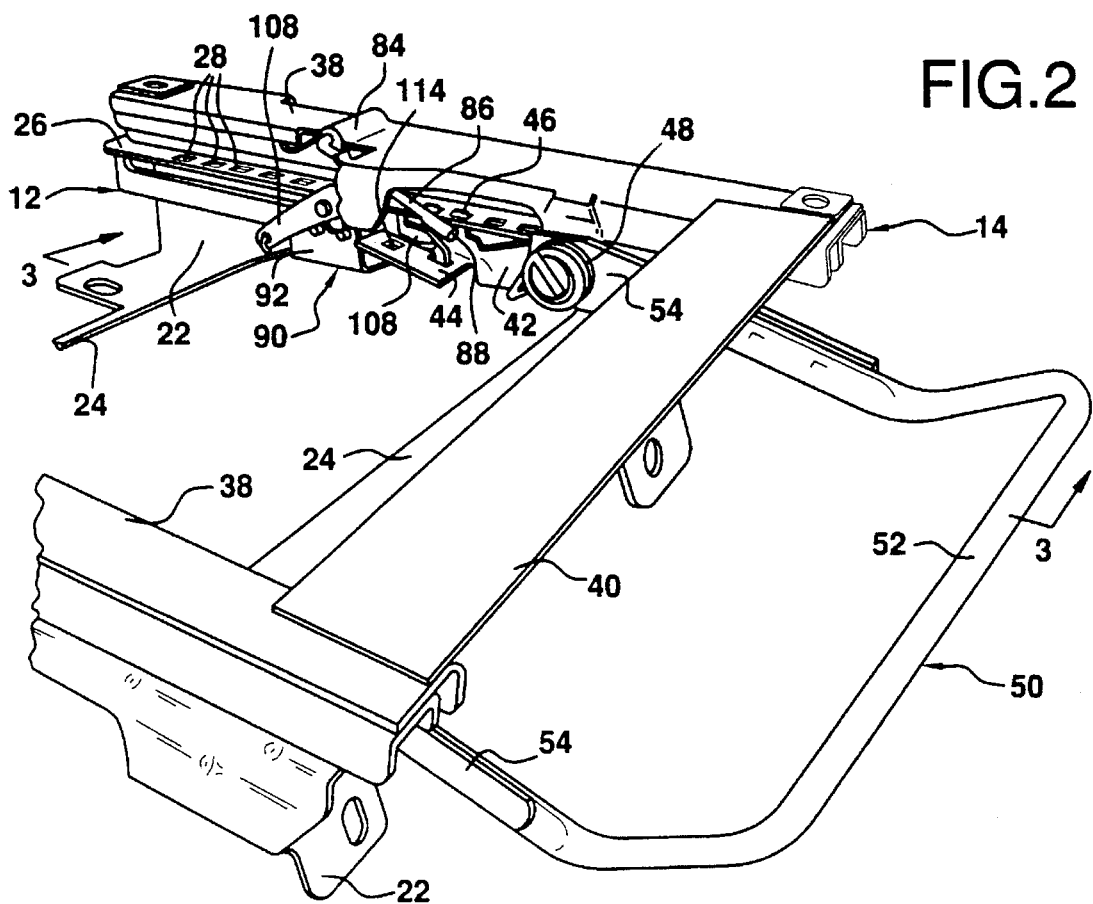
FIG. 2 is a fragmentary perspective view looking downwardly and at the left side of the seat with the seat cushion assembly and seat back cushion assembly removed.
Figure 4:
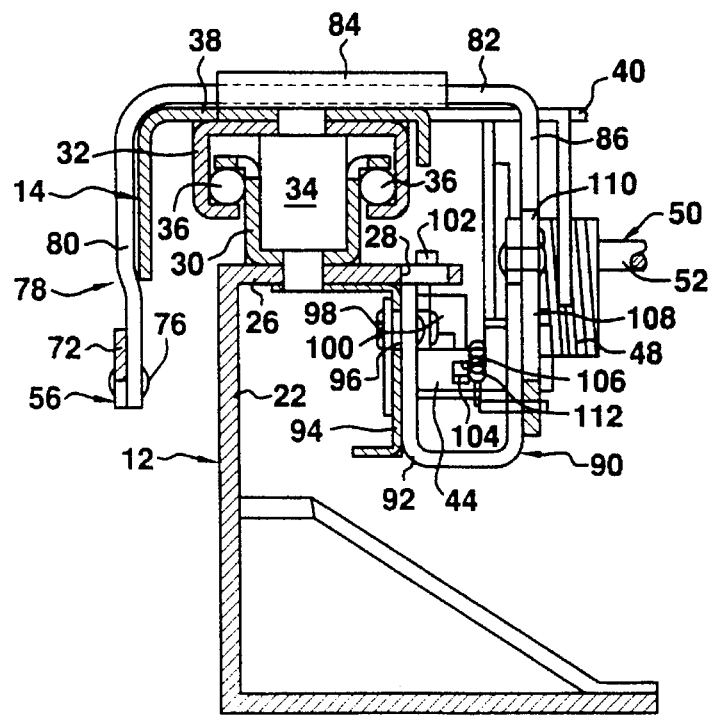
FIG. 4 is an enlarged sectional view taken along the line 4—4 of FIG. 3.

As best shown in FIGS. 2 and 4, the fixed track assembly 12 includes a pair of transversely spaced longitudinally extending lower fixed track members 22 which are interconnected by cross members 24. The lower fixed track members 22 are adapted to be fixed to the floor of the vehicle. Each of the lower track members 22 includes an upper horizontally extending flange 26 which is provided with a series of longitudinally spaced openings 28. As best shown in FIG. 4, fixed to each upper flange 26 is an upper fixed track member 30 forming one of a pair of interengaging track members, the other track member of which is a movable track member 32. Each pair of interengaging track members 30 and 32 may be of any conventional configuration and, as shown, each movable track member 32 is supported by rollers 34 in the associated fixed track member 30. The track members 30 and 32 of each pair are prevented from movement away from one another by roller bearings 36.

Each movable track member 32 which constitutes a part of the movable track assembly 14 has fixed thereto an upper movable track member 38 which is of generally inverted channel-shaped configuration. A cross member 40 at the forward end of the upper movable track members 38 serves to fixedly interconnect the same. In this way, the movable track assembly 14 is rollingly mounted for fore and aft movement on the lower fixed track assembly 12.

The seat 10 also includes a locking mechanism which, as shown, is in the form of a pair of locking arms 42 pivoted to the inside flange of each channel member forming the upper movable track member 38. Each locking arm 42 is formed at the rearward end thereof with a generally horizontally extending plate like portion 44 having a vertical flange along its outer side which terminates vertically in a pair of longitudinally spaced upstanding locking teeth or lugs 46 of a size and shape to engage within a selected adjacent pair of openings 28 in the associated fixed track member 20 so as to maintain the movable track assembly 14 in a desired position of fore and aft adjustment with respect to the fixed track assembly 12. Each locking arm 42 is biased to pivot into a locking position wherein the locking lugs 46 are engaged within selected openings 28 by means of a suitable spring. As shown, the spring is a torsional coil spring 48 surrounding a hub at the forward end of the associated arm, with one end fixed to the pivot shaft within the hub and the other end connected to the associated arm 42. Each locking arm 42 is moved downwardly from the locking position thereof against the bias of the spring 48 into a releasing position enabling the movable track assembly 14 to be moved fore and aft on the fixed track assembly 12.

Figure 3:
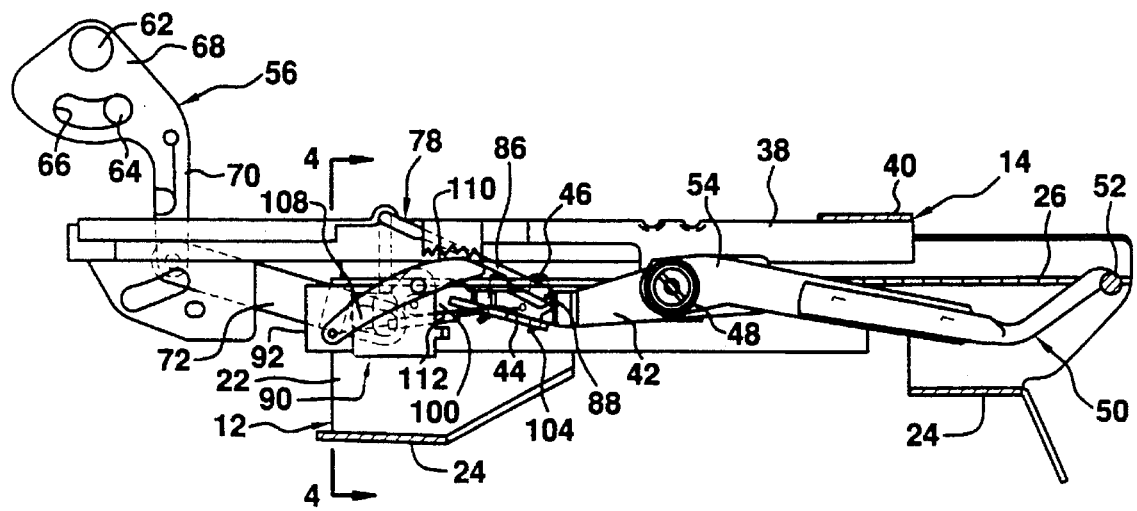
FIG. 3 is a cross-sectional view taken along the line 3—3 of FIG. 2.
Figure 5:
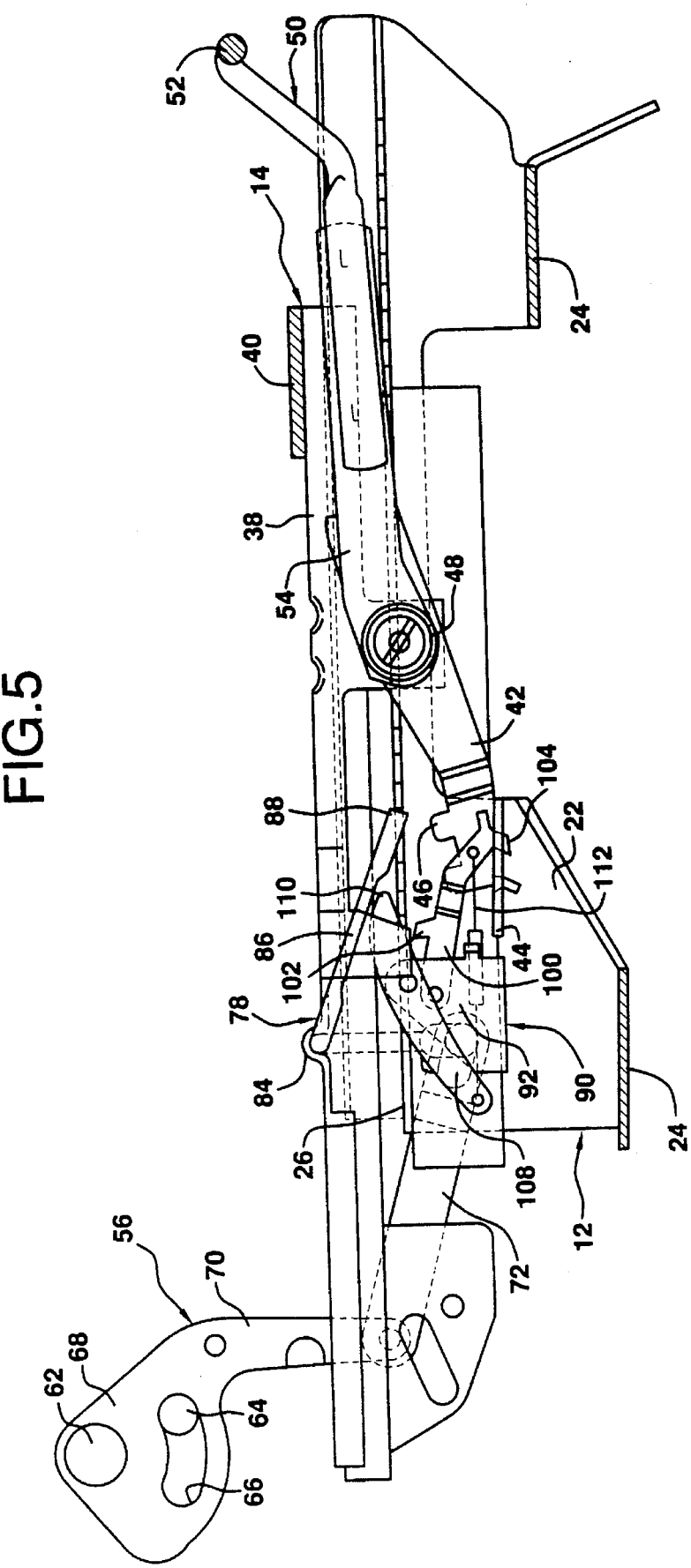
FIG. 5 is a view similar to FIG. 3 showing the position of the seat components after the manual releasing mechanism has been moved into the operative position thereof.

The seat 10 also includes a manually actuated releasing mechanism, generally indicated at 50, which, as shown, is in the form of a U-shaped actuating member or handle 52 having its legs connected with arms 54 which extend forwardly from the hubs of the locking arms 42. The arrangement is such that, when a seat occupant sitting on the seat cushion assembly 16 reaches down and manually moves the handle 52 upwardly from the position thereof, as shown in FIG. 3, into an operative position, as shown in FIG. 5; the locking arms 42 will be moved from the locking position thereof into the releasing position thereof.

The seat 10 also includes a seat back actuated releasing mechanism, generally indicated at 56, operatively associated with the manually lockable and releasable mounting assembly 20, which may be of any well-known construction. The conventional construction shown includes a structure 58 fixedly connected with the frame of the seat cushion assembly 16 and a structure 60 fixed with respect to the frame of the seat back cushion assembly 18. The two structures 58 and 60 are pivotally interconnected, as by a horizontally extending pivot pin 62, shown in dotted lines in FIG. 1. The structure 60 which is fixed to the frame of the seat back cushion assembly 18 extends downwardly beyond the pivot pin 62 and has a pivot pin 64 fixed thereto with its axis parallel with the axis of the pivot pin 62. The pin 64 engages within an arcuate slot 66 formed in a pivoted member 68 forming a part of the seat back actuated releasing mechanism 56. The pivoted member 68 is mounted on the pivot pin 62 and includes a depending seat back arm 70 which is pivoted at its lower end to a connecting link 72. The forward end of the link 72 includes an elongated slot 74 which receives a pin 76. The pin 76 is formed on one end of a bell crank lever, generally indicated at 78. The bell crank lever 78 includes an arm 80 from the free end of which the pin 76 extends, a central transverse portion 82 which is pivotally mounted within an arcuate raised section 84 formed in the upper movable track member 38 and a releasing arm 86 which has a free end indicated at 88. When the seat back cushion assembly 18 is moved from its operative position into its rear accessing position, the free end 88 of the arm 86 moves downwardly from the position shown in FIGS. 2 and 3 to engage locking arm portion 44 and move the locking arm 42 from its locking position to its releasing position.

The seat 10 also includes a memory carriage assembly, generally indicated at 90. As best shown in FIG. 4, the memory carriage assembly 90 includes a frame structure in the form of a U-shaped frame member 92. The outer leg of the U-shaped frame member 92 is mounted for fore and aft sliding movement with respect to the fixed track assembly 12 in a manner independent of the sliding movement of the movable track assembly 14. As shown, the horizontal flange 26 of the lower fixed track member 22 has fixed thereto an elongated angular bracket 94 which includes a longitudinal slot 96 in the vertical leg thereof. The outer leg of the U-shaped frame member 92 is slidably mounted within the slot 96 (see FIG. 4) by longitudinally spaced belts 98 which extend through the outer leg of the U-shaped frame member 92 through the slot 96 and are suitably retained in position, as by nuts or the like.

The memory carriage assembly 90 carries thereon a connector assembly 100. The connector assembly 100, as shown, is preferably in the form of a connector arm the rear end of which is apertured to receive the forward bolt 98 so as to be mounted on the U-shaped frame member 92 for fore and aft movement therewith and for vertical pivotal movement with respect thereto. The connector arm 100 includes an upstanding projection or lower track connector portion 102 disposed on an intermediate section thereof. The connector portion 102 is adapted to engage within an opening 28. The section of the connecting arm 102 which extends forwardly from the connector portion 102 extends laterally inwardly and then forwardly and terminates in a depending upper track connector portion 104. The depending connector portion 104 is adapted to engage within an opening 106 formed in the horizontal plate portion 44 of the locking arm 42.

The connector assembly 100 is operatively associated with an actuator mechanism 108 also carried by the memory carriage assembly 90. As shown, the actuator mechanism 108 is preferably in the form of an elongated lever which is pivoted intermediate its ends to the inner leg of the U-shaped frame member 92 of the memory carriage assembly 90. The actuator lever 108 includes a forward arm having an upper surface 110 which is adapted to engage beneath the releasing arm 86 of the seat back actuated releasing mechanism 56. The rearward end of the actuator lever 108 is apertured to receive one end of an overcenter tensile coil spring 112, the opposite end of which is connected with the forward end portion of the connector arm 100.

OPERATION

The normal operative position of the components of the seat 10 when disposed in the normal operative position thereof is shown in FIGS. 1–4. In this position, it will be noted that the locking arm 42 is disposed in its locking position and the seat back cushion assembly 18 is disposed in its operative position. The manual releasing mechanism 50 is in its inoperative position and the seat back releasing mechanism 56 is in its operative position.

The connector arm 100 of the memory carriage assembly 90 is in a position wherein the connector tooth 102 thereof is engaged within an opening 28 and the connector tooth 104 is engaged within the opening 106 in the plate portion 44 of the locking arm 42. With the locking arm 42 in its locking position, the locking teeth 46 thereof are likewise engaged within openings 28 in the lower track member 22 so as to retain the seat in its operative position. Finally, the actuator lever 108 is in a first position thereof wherein the forward surface 110 thereof is disposed in its uppermost position and the overcenter spring 112 extends between the rear end of the actuator lever 108 and the connector arm 100 so as to bias the actuator lever 108 in a counterclockwise direction, as viewed in FIG. 3, into engagement with the releasing arm 86 and the connector arm 100 in a counterclockwise direction into engagement with the platelike portion 44 of the locking arm 42 with connector tooth 104 extending within opening 106 therein, as viewed in FIG. 3. It is noted that the line of force application of the spring 112 is below the pivots of both the actuator lever 108 and the connector arm 100. It will also be noted that the spring 58 which biases the locking arm 42 into the locking position thereof is sufficient to overcome the bias of spring 112 on the connector arm 100 which is in opposition thereto.

When it is desired to manually adjust the fore and aft position of the seat, the operator seated on the seat cushion assembly 16 reaches down and grasps the U-shaped actuating member 52 and pulls up on the same to move it into its releasing position, as shown in FIG. 5. This movement has the effect of disengaging the locking teeth 46 from the apertures 28 in the lower fixed track member 22. At the same time, the bias of the spring 112 acting on the connector arm 100 serves to move the connector arm downwardly with the locking arm 42 with the connector tooth 104 retained in engagement within the opening 106 in the platelike portion 44 of the locking arm 42. During this downward movement of the connector arm 100, the connector tooth 102 thereof is also disengaged from the opening 28 in the lower fixed track member 22 in which it had been engaged. With the teeth 46 and 102 removed from the previously engaged openings 28, the entire seat 10 can now be moved fore and aft and the engagement of the connector tooth 104 of the connector arm 100 with the opening 106 of the platelike portion 44 of the locking arm 42 enables the memory carriage assembly 90 to be moved with the seat 10 into any desired position of fore and aft movement. When the seat 10 has reached the desired position, the operator simply releases the actuating member 52 and the locking arm 42 is pivoted upwardly by the spring 48 which carries with it the connector arm 100. When the locking arm 42 reaches its locking position, the locking teeth 46 will engage within registering openings 28. Likewise, the connector tooth 102 of the connector arm 100 will engage within a registering opening 28. In this way, the parts are returned to the normal operative positions thereof in a new fore and aft location.

When it is desired to move the seat 10 into a forward accessing position to allow a passenger to enter or leave the back seat area of the vehicle, the lever of the locking and releasing mechanism 20 is actuated to release the seat back cushion assembly 18 from its previously locked condition to be moved forwardly from its normal operative position into its rear accessing position. During this movement, the structure 60 fixed to the frame of the seat back cushion assembly 18 will pivot about the pivotal axis 62. During the initial portion of this movement, the pin 64 will move within the arcuate slot 66 and, when it reaches the end of the arcuate slot, the further movement of the seat back structure 60 will cause the pivot member 68 to pivot about the pivot pin 62 in a counterclockwise direction, as viewed in FIG. 1. This movement of the pivot member 68 carries the seat back arm 70 in a direction in which the lower end thereof moves rearwardly which movement, in turn, moves link 72 in a rearward direction which, in turn, causes the bell crank lever 78 to be pivoted in a counterclockwise direction, as viewed in FIG. 1. This movement of the bell crank lever 78 causes the releasing arm 86 of the bell crank lever to be pivoted in a clockwise direction, as viewed in FIG. 6, causing the end 88 thereof to engage the upper surface of the platelike portion 44 of the locking arm 42 and to move the locking arm 42 with a camming action from its locking position into its releasing position.

It will also be noted that, during the clockwise movement of the releasing arm 86, the surface 110 of the actuator lever 108 will be engaged by the releasing arm 86 causing the actuator lever 108 to pivot in a clockwise direction, as viewed in FIG. 6, about its pivot. As the rear end of the actuator lever 108 moves upwardly, the force of the spring 112 acting on the connector arm 100 and actuator lever 108 reverses relative to both as the line of force of the spring 112 moves above the pivotal axis of each. In this way, the bias of the connector arm 100 is reversed from the previous clockwise bias, as viewed in FIG. 5, to a counterclockwise bias, as viewed in FIG. 6. This action of the spring 112 has the effect of retaining the connector tooth 102 in engagement with the registering opening 28 to thereby retain the memory carriage assembly 90 in the original position thereof. With the parts positioned, as shown in FIG. 6, it is now possible to move the entire seat 10 forwardly while the memory carriage assembly 90 is retained in its original position.

It will be understood that, when the seat back cushion assembly 18 is moved into its rear accessing position, the weight of the seat back cushion assembly itself is of sufficient quantity to overcome the spring 48 of the locking arm 42. Consequently, as the seat 10 with the entire movable upper track assembly 14 together with the locking arm 42, manual actuating mechanism 50 and seat back actuating mechanism 56 are moved forwardly, the initial movement of the seat back actuating mechanism releasing arm 86 away from engagement with the surface 110 of the actuator lever 108 will cause the end 88 of the releasing arm 86 to further pivot in a clockwise direction until the end 88 engages within an opening 114 formed in the platelike portion 44 of the locking arm 42. As soon as the end 88 enters the opening 114, the locking arm 42 is retained in its releasing position. FIG. 7 illustrates this condition after the seat 10 has been moved forward just a slight amount. It will be noted that the forward arm of the actuator lever 108 has been moved into a second position against a stop which is formed on the forward end of the inner leg of the U-shaped frame member 92. In the position shown in FIG. 7, the entire seat can be moved forwardly into a position which clearly allows access to the rear compartment of the vehicle. FIG. 8 illustrates the forward position of the seat and it will be noted that the memory carriage assembly 90 has been retained in its original position.

After the occupant has either entered or left the rear compartment, the seat 10 is then moved rearwardly to return it into its original position. The seat 10 can be returned in either one of two ways. The first way is to return the seat cushion assembly 16 into its original position and thereafter raise the seat back cushion assembly 18 into its operative position. The second way is to raise the seat back cushion assembly 18 into its operative position before the movement of the seat cushion assembly 16 back into its original position.

FIG. 9 illustrates the situation which exists when the user engages the top of the seat back cushion assembly 18 and moves the seat back cushion assembly 18 from its rear access position into its operative position before the seat cushion assembly 16 begins its rear movement back toward its original position. This condition is shown in FIG. 9. It will be noted that the pin 64 and pivoted member 68 have been moved with the seat back cushion assembly 18 from the rear access position thereof, as shown in FIG. 8, to the operative position thereof, as shown in FIG. 9. The forward return movement of the seat back arm 70 with the pivoted member 68 into its operative position, however, does not have an affect on the movement of the bell crank lever 78 since the link 72 which moves forwardly with the seat back arm 70 merely moves with respect to the pin 76 so that the pin 76 is relatively in the rearwardmost portion of the slot 74 rather than the forwardmost portion thereof. It can thus be seen that the seat back cushion assembly 18 can be returned to its operative position from its rear access position without effecting a release of the locking arm 42 from its releasing position because it is retained therein by virtue of the engagement of the end 88 of the arm 86 within the opening 114 of the platelike portion 44 of the locking arm 42.

FIG. 10 illustrates the position of the parts when the seat 10 has been moved back into a position spaced forwardly a short distance from the original position. In this position, the releasing arm 86 engages the cam surface 110 of the actuator lever 108 so that further rearward movement of the seat 10 back into its original position results in the movement of the end 88 of the releasing arm 86 out of the opening 114. This condition is illustrated in FIG. 11.

It will be noted that in this position the rearward end of the platelike portion 44 of the locking arm 42 has been moved into a position below the forwardly extending arm of the actuator lever 108. As soon as the end 88 has been moved out of the opening 114 into engagement with the upper surface of the platelike portion 44, the spring 48 will cause the locking arm 42 to move from the releasing position shown in FIG. 11 toward its locking position. During this movement, the rearward end of the platelike portion 44 will engage the forward end of the lever 108 and pivot it in a counterclockwise direction as viewed in FIG. 11. As the locking arm 42 continues to move upwardly with the upward movement of the forward arm of the actuating lever 108, the locking teeth 46 of the locking arm 42 will enter registering openings 28. In addition, the platelike portion 44 of the locking arm 42 will move upwardly into engagement with the connector arm 100 with the connector tooth 104 extending through the opening 106 therein. As this movement takes place, the rear end of the actuator lever 108 moves downwardly, causing the spring 112 connected therewith to move in an overcenter relation with respect to the pivotal axis of the actuator lever 108 and the connector arm 100.

The force of the spring 112 first reverses its bias on the actuating lever 108 to continue its counterclockwise movement until the surface 110 thereof has fully moved the releasing arm 86 back into its operative position wherein pin 76 of the bell crank lever 78 engages the forward end of the slot 74. After the reversal of the spring 112 with respect to the actuating lever 108, the force of the spring 112 also reverses with respect to the connector arm 100 but, by this time, the locking arm 42 has retained the connector arm 100 in the position in which the connector tooth 102 is still engaged within the registering opening 28. In this way, the seat 10 is returned back into its original position and there has been no movement of the seat 10 in which a component is dragged along a surface under a spring action.

It will be understood that the action is the same when the seat is returned in the second way mentioned above except for the timing of the movement of the seat back releasing mechanism 56. Under these circumstances, when the seat cushion assembly 16 reaches the original position, the end 88 of the releasing arm 86 will be moved out of the opening 114 onto the upper surface of the platelike portion 44 but with the seat back cushion assembly 18 still in its rear accessing position, the weight of the seat back cushion assembly 18 will be transmitted to the releasing arm 86 to retain the locking arm 42 in its releasing position until the movement of the seat back cushion assembly 18 from its rear accessing position back into its operative position is accomplished. As the seat back cushion assembly 18 is moved away from its rear accessing position, the locking arm 42 can move upwardly to accomplish the same movements previously described. The end result is that the parts of the seat 10 are returned into their original positions.

Any United States patent applications or patents mentioned or cited hereinabove are hereby incorporated by reference into the present specification.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A vehicle seat comprising
   a track assembly including a fixed track assembly constructed and arranged to be disposed in fixed relation in a vehicle and a movable track assembly mounted on said fixed track assembly for fore and aft movement with respect thereto,
   a seat cushion assembly carried by said movable track assembly for movement therewith,
   a seat back cushion assembly mounted for movement with the movable track assembly in operative relation with said seat cushion assembly, said seat back cushion assembly being constructed and arranged to be pivotally moved with respect to said seat cushion assembly between (1) an operative position disposed to support the back of an occupant in operative seated relation on said seat cushion assembly and (2) a rear accessing position disposed forwardly in overlying relation to said seat cushion assembly,
   a releasable locking assembly carried by said movable track assembly for movement between locking and releasing positions, said releasable locking assembly being constructed and arranged (1) when in said locking position to lock said fixed and movable track assemblies together with said cushion assemblies in any one of a multiplicity of different fore and aft positions and (2) when in said releasing position to permit relative movement between said fixed and movable track assemblies to enable said cushion assemblies to be moved into any one of said multiplicity of positions,
   a manually actuated releasing mechanism carried by said movable track assembly for movement between an inoperative position and an operative position, said manually actuated releasing mechanism being constructed and arranged with respect to said releasable locking mechanism (1) to control the movement of said releasable locking assembly from the locking position thereof into the releasing position thereof when said manually actuated releasing mechanism is moved from the inoperative position thereof into the operative position thereof and (2) to control the movement of said releasable locking assembly from the releasing position thereof into the locking position thereof when said manually actuated releasing mechanism is moved from the operative position thereof into the inoperative position thereof, a seat back actuated releasing mechanism carried by said movable track assembly for movement between inoperative and operative positions, said seat back actuated releasing mechanism being constructed and arranged with respect to said seat back cushion assembly and said releasable locking mechanism to be moved (1) from the inoperative position thereof into the operative position thereof in response to the movement of said seat back cushion assembly from the operative position thereof into the rear accessing position thereof during which said releasable locking assembly is moved from the locking position thereof into the releasing position thereof and (2) from the operative position thereof into the inoperative position thereof, a memory carriage assembly constructed and arranged to be moved independently in a fore and aft direction with respect to said track assembly, said memory carriage assembly having a connector mechanism mounted thereon for movement between first and second positions, said connector mechanism (1) connecting said memory carriage assembly to said movable track assembly for movement therewith relative to said fixed track assembly when said connector mechanism is in the first position thereof and (2) connecting said memory carriage assembly in fixed relation with said fixed track assembly at a position corresponding to the desired position of use of said cushion assemblies with respect to said fixed track assembly when said connector mechanism is moved from the first position thereof into the second position thereof, said memory carriage assembly also having an actuator mechanism mounted thereon for movement between first and second positions, said actuator mechanism being constructed and arranged (1) to move said connector mechanism from the first position thereof into the second position thereof when said actuator mechanism is moved from the first position thereof into the second position thereof and (2) to move said connector mechanism from the second position thereof into the first position thereof when said actuator mechanism is moved from the second position thereof into the first position thereof, the arrangement of said releasable locking assembly, said releasing mechanisms and said actuator mechanism being such that (1) when said releasable locking assembly is in the locking position thereof said actuator mechanism is in the first position thereof and said connector mechanism is in the first position thereof, (2) when said releasable locking assembly is moved from the locking position thereof into the releasing position thereof by the movement of said seat back actuated releasing mechanism from the inoperative position into the operative position thereof in response to the movement of said seat back cushion assembly from the operative position thereof into the rear access position thereof said actuator mechanism is moved from the first position thereof into the second position thereof causing the connector mechanism to engage the fixed rail and retain said memory carriage assembly in fixed relation to said fixed track assembly at a position corresponding to the position of use of said cushion assemblies therewith, thereby enabling the cushion assemblies to be (A) moved forwardly from said corresponding position with said seat back releasing mechanism and said releasable locking assembly being disposed in a cooperative relationship wherein the releasable locking assembly is retained in its releasing position by a releasing arm connected to the seat back releasing mechanism and (B) returned rearwardly into said corresponding position of use wherein said actuator mechanism disrupts the cooperating relationship between the releasable locking assembly and said seat back releasing mechanism by engaging and moving said releasing arm and thus enabling the releasable locking assembly to return to its locking position and generally simultaneously causing the actuator mechanism to be moved from the second position thereof into the first position thereof, and (3) when said releasable locking assembly is moved from the locking position thereof into the releasing position thereof by the movement of said manually actuated releasing mechanism from the normally biased inoperative position thereof into the operative position thereof said actuator mechanism will be retained in the first position thereof to enable said memory carriage assembly to be moved by said connector mechanism with said cushion assemblies.

2. A vehicle seat as defined in claim 1 wherein said track includes a pair of transversely spaced cooperating sets of said fixed and movable track assemblies, the movable track assemblies being fixed together by structure extending from one movable track assembly to the other.

3. A vehicle seat as defined in claim 2 wherein the fixed track assembly of each cooperating set is formed with a series of spaced openings extending therealong in a fore and aft row, said releasable locking assembly including a locking arm pivoted to each movable track assembly between locking and releasing positions and having spaced teeth for entering spaced openings in the cooperating fixed track assembly when moved into the locking position thereof.

4. A vehicle seat as defined in claim 3 wherein said manually actuated releasing mechanism comprises a U-shaped manual actuating member having a respective free end of each leg thereof fixedly connected with a said locking arm.

5. A vehicle seat as defined in claim 4 wherein the locking arm pivoted to one of said movable track assemblies includes a laterally extending portion providing a generally upwardly extending surface, said seat back actuated releasing mechanism including a lever pivoted to said one movable track assembly, said lever including said releasing arm with a free end engageable with said upwardly facing surface during the movement of said seat back actuated releasing mechanism from the locking position thereof into the releasing position thereof to thereby move said locking arm from the locking position thereof to the releasing position thereof.

6. A vehicle seat as defined in claim 5 wherein said seat back actuated releasing mechanism further includes a seat back arm fixed in depending relation with said seat back cushion assembly so that a lower end of said seat back arm moves generally rearwardly when said seat back cushion assembly is moved from the operative position thereof into the rear accessing position thereof, a link connected at one end to the lower end of said seat back arm and a pin and slot connection between an opposite end of said link and a second arm of said lever.

7. A vehicle seat as defined in claim 6 wherein said memory carriage assembly includes a carriage frame structure mounted on the fixed track assembly of one of said cooperating sets for fore and aft movement therealong independently of the mounting of the cooperating movable track assembly thereon.

8. A vehicle seat as defined in claim 7 wherein said connector mechanism comprises a connector arm pivoted at one end to said carriage frame structure between first and second positions and having spaced first and second connector portions thereon, said first connector portion being constructed and arranged to interengage with the laterally extending portion of said locking arm when said connector arm is in the first position thereof, said second connector portion being constructed and arranged to interengage within a spaced opening in the fixed track assembly cooperating with said one movable track assembly when said connector arm is in the second position thereof.

9. A vehicle seat as defined in claim 8 wherein said actuator mechanism comprises an elongated actuator member pivotally mounted intermediate opposite ends thereof to said memory carriage frame structure, one of the opposite ends of said actuator member having a spring connected therewith which extends to and is connected with said connector arm, said spring being constructed and arranged between said connector arm and said actuator member so as to (1) bias said connector arm away from the second position thereof toward and into the first position thereof when said actuator member is in the first position thereof and (2) bias said connector arm away from the first position thereof toward and into the second position thereof when said actuator member is in the second position thereof.

10. A vehicle seat as defined in claim 9 wherein the other opposite end of said actuator member is constructed and arranged with respect to said releasing arm and said locking arm so that (1) when said actuator member is in the first position thereof said releasing arm engages said other opposite end during the movement of the releasing arm from the locking position thereof into the releasing position thereof to move the actuator member from the first position thereof into the second position thereof and (2) when said actuator member is in the second position thereof said locking arm will engage said other opposite end during the movement of said locking arm from the releasing position thereof into the locking position thereof to move said actuator member from the second position thereof into the first position thereof.

\* \* \* \* \*